United States Patent [19]
Purser

[11] Patent Number: 5,232,643
[45] Date of Patent: Aug. 3, 1993

[54] MANUFACTURE OF FOAMED SEAT CUSHIONS

[75] Inventor: Brian E. Purser, Thorpe Bay, United Kingdom

[73] Assignee: Ford Motor Company, Dearborn, Mich.

[21] Appl. No.: 573,162

[22] PCT Filed: Mar. 16, 1989

[86] PCT No.: PCT/GB89/00283
§ 371 Date: Oct. 25, 1990
§ 102(e) Date: Oct. 25, 1990

[87] PCT Pub. No.: WO89/08547
PCT Pub. Date: Sep. 21, 1989

[51] Int. Cl.⁵ .............................................. B29C 67/22
[52] U.S. Cl. .................................. 264/46.6; 264/46.8; 264/321; 264/511
[58] Field of Search ............... 264/40.3, 46.6, 46.8, 264/511, 321, 46.4

[56] References Cited

U.S. PATENT DOCUMENTS

| | | | |
|---|---|---|---|
| 2,961,710 | 11/1960 | Stark | 264/DIG. 13 |
| 3,061,885 | 11/1962 | Rogers, Jr. et al. | 264/321 |
| 3,239,585 | 3/1966 | Karpovich et al. | 264/84 |
| 3,255,286 | 6/1966 | Luc-Belmont et al. | 264/109 |
| 3,943,215 | 3/1976 | Grune et al. | 264/46.8 |
| 4,025,372 | 5/1977 | Fenton | 264/46.8 |
| 4,285,893 | 8/1981 | Contastin | 264/54 |
| 4,334,944 | 6/1982 | Creyf | 264/321 |
| 4,360,484 | 11/1982 | Rubens | 264/28 |
| 4,493,627 | 1/1985 | O'Malley et al. | 264/46.8 |
| 4,579,700 | 4/1986 | Cavender | 264/46.4 |
| 4,717,518 | 1/1988 | Cavender | 264/51 |
| 4,786,351 | 11/1988 | Elliott et al. | 425/405.1 |
| 4,938,912 | 7/1990 | Pelzer | 264/46.8 |
| 4,963,085 | 10/1990 | Kishii et al. | 264/321 |

FOREIGN PATENT DOCUMENTS 1325622 8/1973 United Kingdom .

*Primary Examiner*—Allan R. Kuhns
*Attorney, Agent, or Firm*—Damian Porcari; Roger L. May

[57] ABSTRACT

Foamed seat cushions are manufactured in a female mold 10 by using vacuum applied through a series of apertures in the mold wall to draw a fabric seat covering into contact with the interior mold surface and then introducing a foam which fills the internal space in the mold. The mold is closed with a lid, and the foam is allowed to expand and cure. Air pressure is applied to the mold through the apertures in the mold wall to compress the foam cushion and partially break down some of the internal structure of the foam and softening the resilience of the foam to the desired level.

5 Claims, 1 Drawing Sheet

MANUFACTURE OF FOAMED SEAT CUSHIONS

BACKGROUND OF THE INVENTION

1. Field of the Invention

This invention relates to the manufacture of foamed seat cushions, in particular cushions made of polyurethane foam and more specifically is directed to a novel and useful method of breaking down some of the internal structure of the foam producing a softening of the foamed cushion.

2. Description of the Prior Art

It is known to manufacture foamed seat cushions in a female mold. A sheet of impervious fabric is introduced into the mold chamber to form the seat covering. A vacuum is applied to hold the seat cover in place against the mold wall. An in situ foaming process is then used to fill the mold chamber behind the seat covering with a foam which adheres to the back surface of the seat covering. A lid is applied to the mold while the foaming reaction takes place. A process of this type is disclosed in GB-PS 1,325,622.

After foaming has been completed, the finished cushion is extracted from the mold with the foam bonded directly to the inner surface of the seat covering. In order to give the foam the required resilience, the normal practice in manufacturing seat cushions is to crush the foam to break down some of the internal structure. This is conventionally done through a mechanical squashing or squeezing process. This mechanical squashing technique requires removal of the cushion from the mold and is potentially damaging to the fabric seat covering. Also, this mechanical squashing technique is incompatible with seat cushions having molded spring inserts.

Another technique is described in U.S. Pat. Nos. 4,579,700 and 4,717,518. This technique involves exposing the curing product to atmospheric pressure at a time when the cell walls have cured sufficiently to partially resist bursting by the pressure of expansion gas. This process requires careful timing of the exposure to atmospheric pressure. The curing foam undergoes a curing process wherein the cell walls are sufficiently strong to support the shape of the molded foam and avoid collapse of the molded foam when exposed to atmospheric pressure but are weak enough to burst by the internal pressure of hot expansion gasses within the cells and thus open the cells upon exposure to atmospheric pressure. This technique requires a special mold having an atmospheric vent valve and a means to open the valve at precisely the correct time.

Other techniques to soften foam include the shock treatment described in U.S. Pat. No. 3,239,585, and the secondary expansion process described in U.S. Pat. No. 4,360,484. Shock treatment requires immersing the foam in a nonsolvent aqueous liquid and impacting the liquid with a physical shock. Secondary expansion requires increasing the gas pressure within the cells and then heating the foam above its heat plastifying temperature to cause secondary expansion. Neither technique easily lends itself to the manufacture of cloth covered seat cushions.

All the methods described above either require post mold processing such as the physical squashing and shock treatment, or require complicated molding techniques such as atmospheric venting and secondary expansion. They do not permit the use of existing molds to perform an inmold crushing of the foam using conventional molding equipment.

OBJECTIVE

It is thus an object of this invention to teach a method for manufacturing a seat cushion with a crushed foamed body in a single molding process.

It is a further object of this invention to manufacture crush foamed seat cushions using existing molding equipment.

It is another object of this invention to vary the amount of crush of the foamed cushion by varying the amount of positive air pressure applied to the seat cushion.

It is another object of this invention to teach the use of positive air pressure to crush of the foam cushion so that there is no mechanical contact with the finished surface of the seat covering.

These and other objects and advantages of the present invention will become apparent by the present invention will become apparent by the following disclosure and preferred embodiments.

BRIEF SUMMARY OF THE INVENTION

According to the present invention, there is provided a method of manufacturing a foamed seat cushion wherein a seat cover is drawn into a female mold by the use of vacuum. The mold is filled by a foamed in situ mixture and a lid is placed on the mold. The foam is allowed to expand and cure within the mold. Air pressure is applied to the mold through the apertures in the mold wall to compress the foam cushion. The compressed foam breaks down some of the internal structure of the foam cells and makes the foamed cushion softer and more resilient.

In this way, the necessary manufacturing step of crushing the foam is carried out without removing the cushion from the mold by merely by reversing the pressure applied to the mold chamber.

BRIEF DESCRIPTION OF THE DRAWINGS

The invention will now be further described, by way of example, with reference to the accompanying drawing in which.

DETAILED DESCRIPTION OF THE INVENTION

Figure 1:
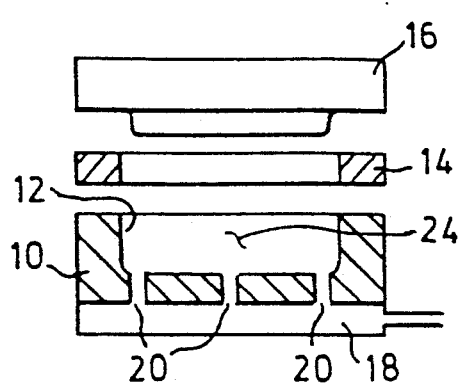
FIG. 1 is an exploded cross sectional view of a mold useful in practicing the invention.

FIG. 1 shows a partially exploded view of the molding equipment necessary to practice the invention. Female mold 10 has an interior mold wall 12. Mold wall 12 has a generally planar surface surrounded by an upstanding annular surface. Cloth clamping ring 14 surrounds the outer periphery of upstanding annular surface of wall 12. Lid 16 engages clamping ring 14 to form a seal. Lid 16, clamping ring 14, and mold wall 12 define a mold chamber 24. Adjacent the generally planar surface of mold wall 12 is a pressure chamber 18. Pressure chamber 18 communicates with mold chamber 24 through a plurality of apertures 20 through mold wall 12.

Female mold 10 is of the type commonly used in the manufacture of cloth covered seat cushions. Pressure chamber 18 communicates with a vacuum means (not shown) and a pressure means (not shown).

Figure 2:
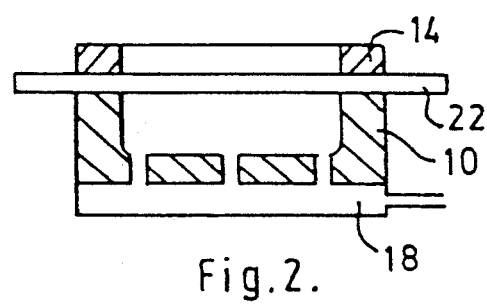
FIGS. 2–7 are a view similar to that shown in FIG. 1 but showing the foaming and compressing operation.
Figure 3:
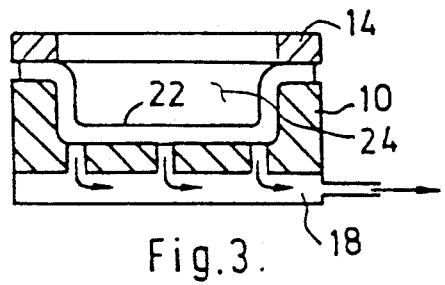

A piece of cloth covering 22 is positioned between clamping ring 14 and female mold 10 (as shown in FIG. 2). Cloth 22 is clamped to the top of the mold by cloth clamping ring 14 and then vacuum is applied to the pressure chamber 18 to draw the cloth into the mold chamber 24 so that it lines mold wall 12 (as shown in FIG. 3). Cloth covering 22 may be any suitable fabric or fibrous material or any flexible vinyl or leather material suitable for seat coverings. Cloth covering 22 is treated or coated so that it is substantially impervious to air.

Clamping ring 14 allows cloth 22 to slip between clamping ring 14 and female mold 10. Cloth covering 22 is drawn snugly against mold wall 12 as a vacuum is applied pressure to chamber 18. U.S. Pat. No. 3,943,215 describes a process for permitting cloth 22 to slip through a clamping ring and be drawn into a female mold and is incorporated herein by reference.

Figure 4:
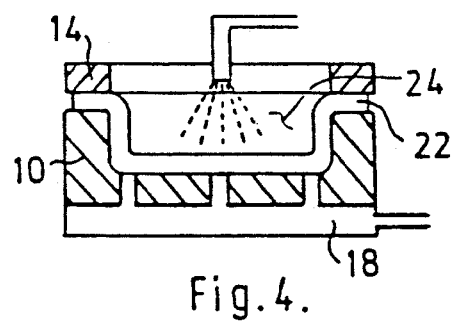
Figure 5:
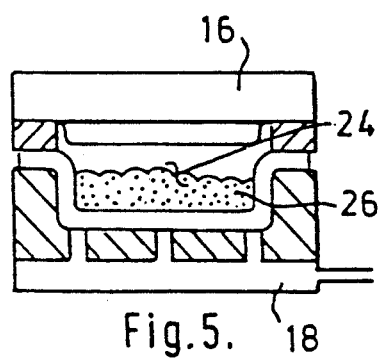
Figure 6:
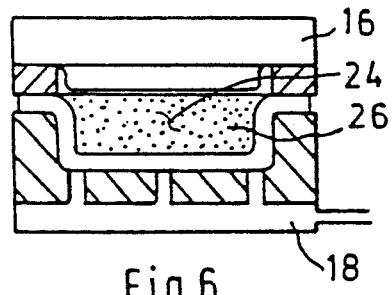

After cloth covering 22 is drawn against mold wall 12, an expandable foam material 26, such as polyurethane foam, is introduced into mold chamber 24 (as shown in FIG. 4). Foam 26 adheres directly to the rear face of cloth covering 22. Lid 16 is put in place to seal mold chamber 24. Foam 26 expands to fill mold chamber 24 and forms a cushion shape (as shown in figures 5 and 6).

Vacuum is applied to pressure chamber 18 until foam material 26 has cured. The method described up to this point is essentially the conventional method of manufacturing a cloth covered automotive set cushion.

Figure 7:
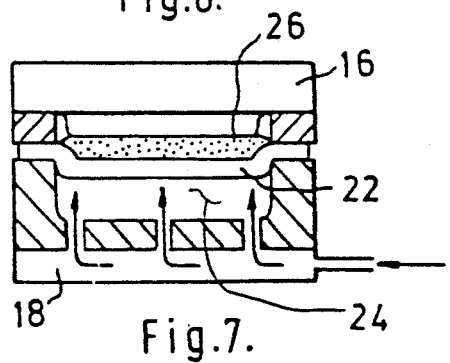

The final stage in the process compresses the molded cushion thereby squashing foam 26 (as shown in FIG. 7). A positive air pressure is applied to the champer 18. This pressure acts on the finished surface of cloth covering 22 to compress the now expanded and cured foam 26. The squashing of foam 26 causes a break down of some of the internal structure of the foam and results in a crushing and softening of foam 26.

The amount of softening of foam 26 is determined by the amount of positive air pressure applied to pressure chamber 18. If greater softening of foam 26 is desired, greater positive air pressure is applied, if less softening is desired, less positive air pressure is applied.

The positive air pressure and vacuum can be supplied by a single air pump (not shown). By reversing the direction of the pump motor, the air pump can supply either the vacuum or the positive air pressure.

The present invention permits the in mold manufacture of integral seat cushions having a crushed foam body utilizing existing molding equipment.

The invention thus provides a very simple and expeditious way of carrying out the necessary step of crushing the foam cushion.

It should be recognized and understood that the foregoing description of presently preferred embodiments of the invention are presented for exemplification and not limitation of the invention. Certain modifications and variations of the fastener will be apparent to the skilled of the arts in view of the present disclosure and the present or future state of the art, which modifications and variations are intended to be within the scope of the following claims.

What is claimed is:

1. A method of manufacturing a foam cushion wherein said foam cushion is compressed in a mold to crush some internal foam cells, said method comprising:
   drawing a covering into said mold by a vacuum, said vacuum applied to apertures in said mold;
   filling said mold with an expandable foam mixture;
   allowing said mixture to cure to form a foam body, said body having internal foam cells; and
   applying air pressure to said apertures to compress said foam body and crush some of said internal foam cells.

2. The method of claim 1 and further comprising: clamping said covering to said mold before drawing said covering into said mold.

3. The method of claim 2 and further comprising: removing said foam cushion from said mold.

4. A method of manufacturing an integrally molded cushion comprising a foam body and a covering adhered to said foam body, wherein said foam body is compressed to crush some internal foam cells, said method comprising:
   positioning said covering in a female molding tool having an interior mold surface with a plurality of apertures therethrough;
   clamping said covering to said female molding tool;
   covering said female molding tool with a lid;
   applying a vacuum to said apertures and drawing said covering into said interior mold surface;
   introducing an expandable foam material into said female molding tool to form said foam body;
   allowing said foam material to cure and form said foam body, said foam body having internal foam cells; and
   applying air pressure to said apertures to compress said foam body and crush some of said internal foam cells.

5. The method of claim 4 and further comprising after applying air pressure, removing said foam cushion from said mold.

* * * * *